(12) United States Patent  
Ulasen et al.

(10) Patent No.: US 12,314,219 B2  
(45) Date of Patent: May 27, 2025

(54) SYSTEM AND METHOD FOR DATA CLASSIFICATION USING MACHINE LEARNING DURING ARCHIVING

(71) Applicant: Acronis International GmbH, Schaffhausen (CH)

(72) Inventors: Sergey Ulasen, St. Petersburg (RU); Mark Shmulevich, Moscow (RU); Stanislav Protasov, Moscow (RU); Serguei Beloussov, Costa del Sol (SG)

(73) Assignee: Acronis International GmbH, Schaffhausen (CH)

( * ) Notice: Subject to any disclaimer, the term of this patent is extended or adjusted under 35 U.S.C. 154(b) by 351 days.

(21) Appl. No.: 16/018,172

(22) Filed: Jun. 26, 2018

(65) Prior Publication Data

US 2018/0373722 A1 Dec. 27, 2018

Related U.S. Application Data

(60) Provisional application No. 62/524,753, filed on Jun. 26, 2017.

(51) Int. Cl.
*G06F 16/11* (2019.01)
*G06F 16/28* (2019.01)
(Continued)

(52) U.S. Cl.
CPC .......... *G06F 16/113* (2019.01); *G06F 16/119* (2019.01); *G06F 16/285* (2019.01);
(Continued)

(58) Field of Classification Search
CPC .... G06F 16/113; G06F 16/119; G06F 16/285; G06N 20/00; G06N 3/0445;
(Continued)

(56) References Cited

U.S. PATENT DOCUMENTS

| | | | |
|---|---|---|---|
| 8,429,346 B1 * | 4/2013 | Chen | G06F 3/0649 711/114 |
| 8,972,340 B1 * | 3/2015 | Haase | G06F 16/113 707/609 |

(Continued)

*Primary Examiner* — Pierre M Vital
(74) *Attorney, Agent, or Firm* — ArentFox Schiff LLP; Michael Fainberg

(57) ABSTRACT

Disclosed are systems and methods for data archiving using machine learning techniques. The system collects statistical information and event data and processes them using machine learning techniques to classify data and/or predict data access demands. The system receives statistical information related to user access of a plurality of files, which can effectively "train" the system to archive data that is not needed at a certain moment and extract it at other moments. The system identifies, using a machine learning module, a pattern of access in the plurality of files based on the received statistical information. The system modifies, using the identified pattern of access, a threshold value related to file access, and assigns a set of files from the plurality of files an access classification based on the modified threshold value. The system migrates the set of files between hot and cold data areas based on the assigned access classification.

11 Claims, 6 Drawing Sheets

(51) Int. Cl.
  *G06N 3/044* (2023.01)
  *G06N 3/045* (2023.01)
  *G06N 5/025* (2023.01)
  *G06N 20/00* (2019.01)

(52) U.S. Cl.
  CPC .............. *G06N 3/044* (2023.01); *G06N 3/045* (2023.01); *G06N 5/025* (2013.01); *G06N 20/00* (2019.01)

(58) Field of Classification Search
  CPC ........ G06N 3/0454; G06N 5/025; G06N 3/08; G06N 3/044; G06N 3/045
  USPC ......................................................... 707/667
  See application file for complete search history.

(56) References Cited

U.S. PATENT DOCUMENTS

| | | | | |
|---|---|---|---|---|
| 9,275,065 | B1* | 3/2016 | Ganesh | G06F 21/604 |
| 9,665,630 | B1* | 5/2017 | Bigman | G06F 16/185 |
| 10,339,455 | B1* | 7/2019 | Parush-Tzur | G06N 5/04 |
| 10,452,993 | B1* | 10/2019 | Hart | G06N 20/00 |
| 2008/0027905 | A1* | 1/2008 | Jensen | G06F 3/0644 |
| 2009/0132621 | A1* | 5/2009 | Jensen | G06F 3/0673 |
| 2010/0274983 | A1* | 10/2010 | Murphy | G06F 11/1456 |
| | | | | 711/162 |
| 2011/0010514 | A1* | 1/2011 | Benhase | G06F 3/061 |
| | | | | 711/162 |
| 2011/0270809 | A1* | 11/2011 | Dinkar | G06F 16/1748 |
| | | | | 707/692 |
| 2012/0284309 | A1* | 11/2012 | Adkins | G06F 16/27 |
| | | | | 707/782 |
| 2012/0296883 | A1* | 11/2012 | Ganesh | G06F 3/0608 |
| | | | | 707/693 |
| 2013/0290598 | A1* | 10/2013 | Fiske | G06F 3/0625 |
| | | | | 711/103 |
| 2014/0188868 | A1* | 7/2014 | Hunter | G06F 3/061 |
| | | | | 707/736 |
| 2014/0281260 | A1* | 9/2014 | Peterson | G06F 11/008 |
| | | | | 711/135 |
| 2015/0039837 | A1* | 2/2015 | Quan | G06F 3/061 |
| | | | | 711/136 |
| 2015/0121024 | A1* | 4/2015 | Kolvick | G06F 16/1727 |
| | | | | 711/162 |
| 2016/0381176 | A1* | 12/2016 | Cherubini | H04L 67/1097 |
| | | | | 709/219 |
| 2017/0090776 | A1* | 3/2017 | Kowles | G06F 3/0655 |
| 2017/0262185 | A1* | 9/2017 | Long | G06F 3/0667 |
| 2017/0329552 | A1* | 11/2017 | Baldwin | G06F 3/0685 |
| 2018/0060727 | A1* | 3/2018 | Rainwater | G06N 3/0454 |
| 2018/0150548 | A1* | 5/2018 | Shah | G06F 16/285 |
| 2018/0157655 | A1* | 6/2018 | Dain | G06F 16/119 |

* cited by examiner

SYSTEM AND METHOD FOR DATA CLASSIFICATION USING MACHINE LEARNING DURING ARCHIVING

CROSS-REFERENCE TO RELATED APPLICATIONS

This application claims the benefit of U.S. Provisional Application No. 62/524,753, filed Jun. 26, 2017, which is incorporated by reference herein.

FIELD OF TECHNOLOGY

The present disclosure relates generally to the field of data archiving, and more specifically, to systems and methods for data classification of cold and hot data using machine learning during data archiving.

BACKGROUND

In an increasingly common scenario, a user of a computer or server has to manage and deal with a large number of files, even though the user does not necessarily need all of the files at a given moment. At the same time, the storage devices of a computer or server, with which the user works directly, has a limited amount of resources (e.g., disk space). Some files have to be archived, which typically involves creating a backup of the files by copying the contents of the storage devices onto some other medium (such as another hard disk drive, a DVD ROM, a DVD RAM, a flash disk, tape drive, etc.) or, frequently, over a network (such as to a remote server or to a cloud storage service).

In some known approaches to data archiving, links to the archived files instead of the files themselves are placed on a front end of the server. If the user accesses these files, they are requested from the remote data store and are provided to the user. The drawbacks to this procedure include significant delays and lost time, which are caused by network latency and time needed to search and extract archived files. These problems are especially acute in large corporations, which have a very large amount of data and a high number of users that work with this data.

SUMMARY

A system and method is disclosed herein for managing data storage resources, and, more particularly, for data archiving using machine learning techniques. The described archiving system collects statistical information and event data and processes them using machine learning techniques to classify data and/or predict data access demands. Doing so enables the archiving system to have improved efficiency and responsiveness compared to archiving data on the basis of a simple static metric or threshold (e.g., number of hits or last access time). For example, the machine learning technique described herein can learn a pattern in which users access a certain set of files only during business hours, and classify such files as hot data, resulting in their relocation to fast storage (e.g., RAM). Similarly, the machine learning techniques can determine a pattern in which at a given time other files are not accessed by users, and classify such files as "cold data" to be placed in the archive store. The statistics on the use and access of all files in the system is constantly collected by a data processing module and accumulated by a machine learning module. Thus, the collection of statistics will effectively "train" the system each time to archive data that is not needed at a certain moment and extract it on the basis of a statistical assumption that it will be in demand.

According to one aspect of the present disclosure, a method for data archiving using machine learning is provided. The method includes receiving statistical information related to user access of a plurality of files, and identifying, using a machine learning module, a pattern of access in the plurality of files based on the received statistical information. The method further includes modifying, using the identified pattern of access, a threshold value related to file access, and assigning a set of files from the plurality of files an access classification based on the modified threshold value. The method further includes migrating the set of files from a first storage device to a second storage device based on the assigned access classification.

In another aspect, modifying, using the identified pattern of access, the threshold value related to file access includes decreasing the threshold value related to file access in response to the identified pattern of access indicating a decrease in likelihood that the plurality of files will be accessed.

In another aspect, assigning the set of files from the plurality of files the access classification based on the modified threshold value further includes assigning the access classification responsive to determining that the set of files exceeds the threshold value related to file access, wherein the access classification is a hot data access classification, and assigning the access classification responsive to determining that the set of files does not exceed the threshold value related to file access, wherein the access classification is a cold data access classification.

In another aspect, the first storage device is associated with a hot data access classification and the second storage device is associated with a cold data access classification, and the first storage device has higher performance characteristics than the second storage device.

In another aspect, the identified pattern of access includes a pattern specifying a periodic window of time in which at least one of the plurality of files is frequently accessed.

In another aspect, the identifying the pattern of access in the plurality of files based on the received statistical information further includes generating, based on the statistical information, a sequence-to-sequence model indicating an occurrence of a first event is associated with an occurrence of a second event related to access of at least one of the plurality of files. In some aspects, the method further includes, responsive to detecting the first event has occurred, migrating the at least one of the plurality of files to the second storage device. In some aspects, the sequence-to-sequence model specifies the occurrence of the first event being execution of an application is associated with the occurrence of the second event being access of at least one of the plurality of files having the same file type as the application.

In another aspect, the pattern of access is further based on at least one of: a number of access requests, time of access requests, and file size of the plurality of files.

In another exemplary aspect, a system for data archiving using machine learning is provided. The system includes a first storage device, a second storage device, and a hardware processor. The hardware processor is configured to receive statistical information related to user access of a plurality of files, identify, using a machine learning module, a pattern of access in the plurality of files based on the received statistical information, and modify, using the identified pattern of access, a threshold value related to file access. The hardware processor is further configured to assign a set of files from the plurality of files an access classification based on the modified threshold value, and migrate the set of files from the first storage device to the second storage device based on the assigned access classification.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method, and computer program product for efficient data archiving using machine learning. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Exemplary aspects of the present disclosure use a machine learning system to optimize the hierarchical storage of files (i.e., "hot" and "cold" areas) for both archiving and for quick, predictive data extraction. The classification and separation of data into so-called "hot" and "cold" data remains an important part of data archiving and storage systems. Hot data is data that is used often or almost constantly, and therefore access to such data should be fast with minimal delays or latency. In contrast, cold data is used less frequently and may be stored in devices having increased latency but lower costs. Free space on storage devices is often limited, while "fast" memory devices (e.g., RAM, SSD) are often more expensive than "slow" memory device (e.g., cloud storage, tape drives, disk drives).

Current techniques for automatically archiving data (i.e., migrating it from a "hot" area the "cold" area) is to set a threshold, on the basis of which the data will be moved to archive storage. For example, such a threshold can be based on the number of access to the data (e.g., files) or the date and time of the last access. If the file has not been read for a long time (e.g., more than several months), then, accordingly, the data is classified as "cold data" and placed in the archive storage. Often such archiving is performed at the operating system level.

The drawback of known approaches is its lack of flexibility. For example, there may be situations in there are no requests to a particular file at the time of peak loads of the system or corporate network. In other situations, this file may be claimed at certain time intervals, and the rest of the time, there are no requests to the file. Another known issue is the use of such static attributes for archiving. In current approaches, a particular file might be archived, but the system overall does not know when the file may be needed such that it can be appropriately extracted from the archive and, thus, minimize system or network delays.

Figure 1:
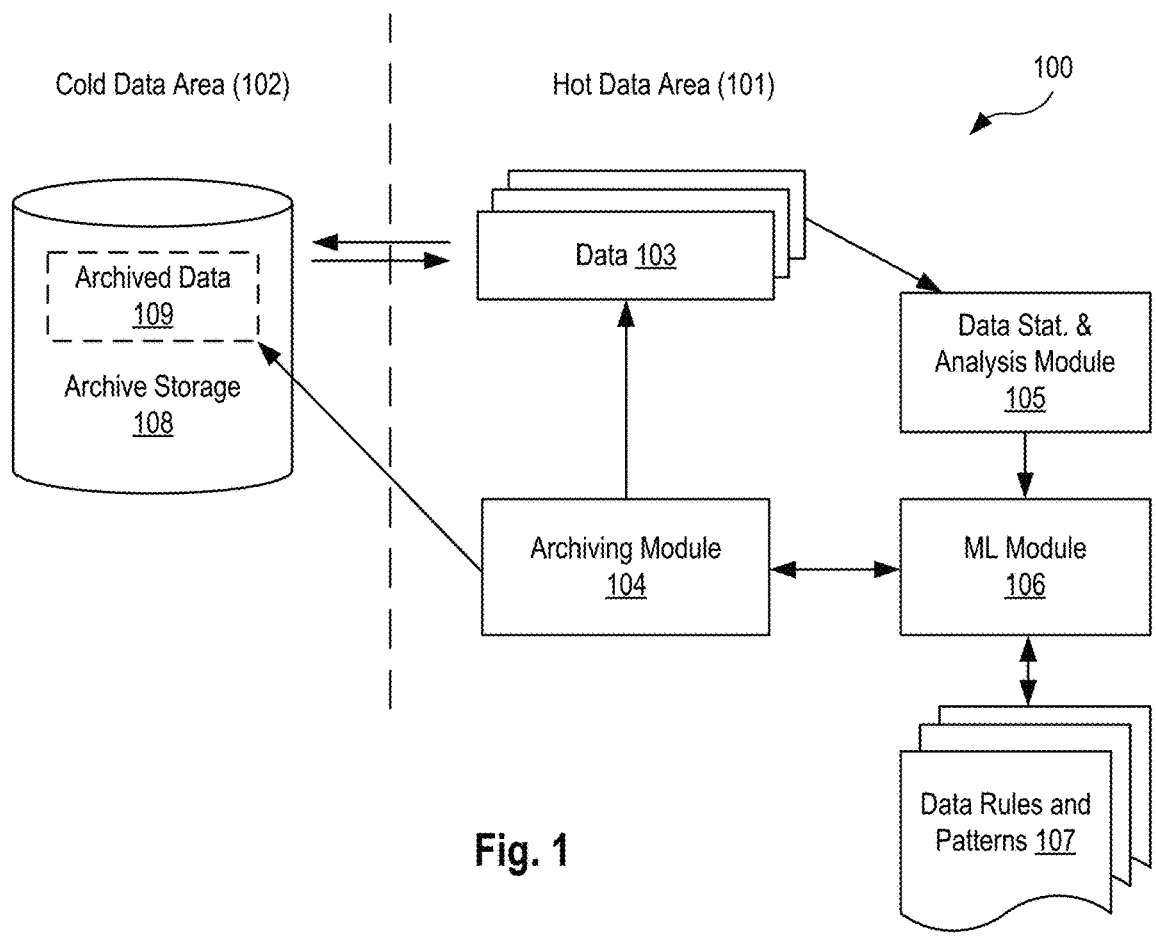
FIG. 1 is a block diagram illustrating a system for data archiving using machine learning according to an exemplary aspect.

FIG. 1 is a block diagram illustrating a system 100 for data archiving using machine learning according to an exemplary aspect. The system 100 includes an archiving module 104 configured to perform an archiving process on data 103 by migrating certain data (i.e., archived data 109) from a "hot" data area 101 to a "cold" data area. By way of example, the data 103 may embodied as one or more files, directories, or other data structures in a file system. The hot data area 101 represents a zone of fast memory storage (e.g., RAM, SSD), while the cold data area 102 represents a zone of slower (and cheaper) memory for cold data. That is, the hot data area 101 may be backed by one or more memory devices having higher performance characteristics (albeit higher cost as well) relative to the storage devices backing the cold data area 102, such as an archive storage 108.

According to an aspect of the present disclosure, the system 100 is configured to provide the classification of "hot" and "cold" data, which provides the technical result of improved storage efficiency, with less latency, and at lower storage costs. In one aspect, the archiving module 104 may enhance the efficiency of the archiving system 100 by perform archiving procedures based on the collection of data statistics, event data, log data, and analysis related to the data 103, and further based on the processing of that data using machine learning techniques. Accordingly, the data 103 in the described system 100 is archived not simply on the basis of a static threshold (e.g., the number of hits or last access time), but also taking into account other factors.

The system 100 may include a data statistics and analysis module 105 configured to collect statistics, event data, log data, and other information related to the use of data 103. Examples of the statistics about the data 103 include statistics about when (e.g., date-time) data is accessed (read or modified), which users are accessing the data, the types of data being used (e.g., Word documents), frequency and recency of access, and other suitable statistics. The statistics may be aggregated (i.e., as sum totals, counts, averages, etc.)

and/or maintained in a log as a stream of events. The statistics may be historical data (i.e., occurring substantially in the past) or contemporaneous events. The data statistics and analysis module 105 may provide the collected information and statistics to a machine learning (ML) module 106.

The system 100 may include a ML module 106 configured to manage the archiving module 104 based on continuously collected and received information. In one aspect, the ML module 106 may be configured to accumulate the collected information statistics related to the use of data 103 and use the data to learn from and make predictions about use of data 103 for archiving purposes. In an aspect, the ML module 106 may use the information to effectively "train" the system 100 each time to archive the data 103 that is not needed at a certain moment and extract it on the basis of a statistical assumption that the data will be in demand. In some aspects, the ML module 106 may train the system 100 using a plurality of data rules and patterns 107, some of which may be pre-determined, and others of which are generated or modified by the ML module 106 using machine learning techniques.

In one aspect, the ML module 106 may be configured to classify a group of files as "hot data" using a ML model that was trained using statistics indicating the frequency of access for that particular group of files and/or "similar" files (e.g., having similar metadata attributes). In some aspects, the ML module 106 may be further configured to classify a group of files as "hot data" or "cold data" using a ML model that is also trained using statistical data indicating a date and time (e.g., timestamp) of access. In yet other aspects, the ML module 106 can classify the file(s) using ML models trained on historical statistics indicating which users accessed certain data, which types of data was accessed, frequency/recency of access, and other suitable statistics described herein.

In one example, using a model trained using statistics with date-time occurrences, the ML module 106 may recognize that a certain set of files is used by certain users only during a daily window of time from 8 AM to 8 PM (i.e., approximately business hours). These files may be proactively classified by the ML module 106 as hot data and are therefore located on fast storage or in RAM. Accordingly, at a given time, other files that users do not access can be classified as cold data, and placed in the archive storage 108 as archived data 109. The ML module 106 may determine that, during any time outside of that window (i.e., non-working hours or off-peak hours), the threshold value of file access can be lowered. Accordingly, at those times, files that were considered as hot data can then be transferred to the archive storage 108 or removed from the RAM. In another example, the ML module 106 based on the collected information may recognize that a user X always opens a file F on work days from approximately 9:00 AM to 12:00 PM. Accordingly, the ML module 106 may indicate to the archiving module 104 that the rest of the time the file F can be stored in a cold data area 102 (e.g., disk storage) and can be classified as cold data.

In one aspect, the ML module 106 may be configured to determine dynamic thresholds and patterns for each file and/or group of files. In some aspects, the ML module 106 may use a clustering algorithm to determine groupings of one or more files for purposes of applying data archiving rules. The clustering algorithm may use as clustering parameters file metadata associated with the file, as well as the statistics related to data access received from the data statistics and analytics module 105. The clustering parameters may include file type (e.g., documents, executables), file location, file size, file permissions and access control, date-time related metadata (e.g., when last modified), user-related metadata (e.g., who last modified the file), etc. In this way, the ML module 106 is able to determine different data access thresholds for groups of files depending on their different parameters, e.g., file size. For example, the ML module 106 may select a data-access-request threshold of 10 requests per unit time for a large file, and a higher threshold (e.g., 100 requests per unit time) for small files. It has been determined that such a ML pattern is advantageous because the archiving module 104 can continue to keep small files on cold storage because the module can retrieve them relatively quickly from cold storage area if needed. Meanwhile, large files may require more time and resources to retrieve them from the cold data area, and as such, having a lower threshold of 10 requests can be a good reason to move them to hot storage.

In another aspect, the ML module 106 may use ML models to identify time-based conditions for using thresholds and/or patterns in data archiving. That is, the ML module 106 may select a data access threshold based on an indication of a peak time period, as determined by machine learning, and a different (e.g., higher) data access threshold based on an indication of a non-peak time period. For example, the ML module 106 may classify data files as hot data or cold data based on one data access threshold of 5 requests per unit time during a peak time period, and based on a higher data access threshold of 20 requests per unit time during a non-peak time period, e.g., for the same file and/or group of files.

According to another aspect, in addition to the frequency and access time of data 103, the ML module 106 may be configured to use a "sequence-to-sequence" machine learning model predicting the probability that one event will lead to another (e.g., that a file will be requested by the user) for archiving the data 103. For example, the ML module 106 may identify that when a user runs a word-processing program such as MS Word® on a computer, then there is a higher probability that document files (DOC/DOCX files) will be opened rather than spreadsheet files (such as for MS Excel®). In another example, the ML module 106 may generate a sequence-to-sequence model indicating that if a user opens a photo file in a photo album folder, then there is a likelihood that other photos from this album will be accessed by the user. Accordingly, the ML module 106 may instruct the archiving module 104 to extract these photos (from archive storage 108) in advance and place them in the hot data area 101 (e.g., fast memory, cache).

In the aspect using a sequence-to-sequence model, the ML module 106 may be configured to use a recurrent neural network (RNN) that accepts as input the statistics pertaining to current operations of the file system (e.g., via data statistics and analysis module 105). The ML module 106 may build an encoder-decoder recurrent neural network that includes an "encoder" network that is configured to read event data of current input requests for data/file access and a "decoder" network that predicts a likely next data request for other file(s). For example, the ML module 106 may feed event data indicating a data access request for executable program files of a word-processing application at a given location in storage (e.g., "filepath/to/word.exe") to the encoder network of the sequence-to-sequence model. Based on this input, the decoder network of the sequence-to-sequence model may output a prediction that data access requests for certain files having a document filetype (e.g., .doc or .docx files) are likely to occur. In response, the ML module 106 may instruct the archiving module 104 to move such document files to the hot data area 101 based on this prediction.

Figure 2:
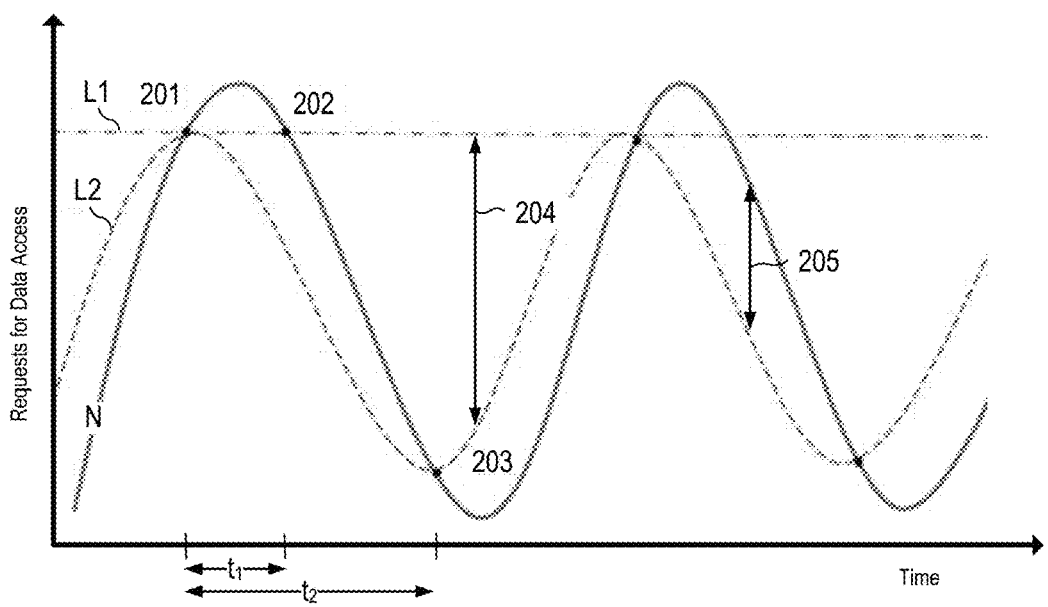
FIG. 2 is a graph chart illustrating a graph of requests for data access over time according to an exemplary aspect.

FIG. 2 is a graph chart illustrating a graph 200 of requests for data access over time according to an exemplary aspect. The graph chart illustrates the described scheme of dynamic classification of data using the ML module 106. The graph 200 includes a curve N representing the number of requests for access to data based on time, and thresholds L1 and L2. In one aspect, the curve N may be calculated as the number of requests for a file or a group of files in a given unit of time, or the probability of accessing the file or group of files. The threshold L1 represents a static threshold used for the classification of cold and hot data and for the subsequent data migration into hot/cold storage. The second threshold L2 represents a dynamic threshold used for the classification of cold and hot data, based on the inclusion of a variety of factors, including statistics, probability parameters, etc., using machine learning.

The graph 200 depicts a point 201 along the curve N that represents the point after which the file(s) have exceeded the static threshold L1, i.e., the threshold amount of requests for data access, and the file(s) are moved to hot storage area 101. The point 202 along the curve N represents the point after which the file(s) have fallen below the static threshold L1 (e.g., the files are less frequently being accessed) and are removed out of hot storage 101. As such, the time period $t_1$ between points 201 and 202 represents the time period in which the file(s) are stored within hot storage 101 based on the use of the static threshold L1.

In an example scenario using the dynamic threshold L2, the point 201 along the curve N also represents the point after which the file(s) have exceeded the dynamic threshold L2, i.e., the threshold amount of requests for data access after which the files are moved to hot storage 101 as determined using machine learning information. As shown, in the time period following the point 201, the frequency of requests for data access for the given files rises, peaks, and then falls, as does the dynamic threshold L2. The point 203 along the curve N represents a point in time in which the frequency of requests for data access fails to meet the threshold L2, and the archiving module 104 moves the data back to cold storage. As such, the time period $t_2$ between the points 201 and 203 represent the time period in which the file(s) are stored within hot storage based on the use of the dynamic threshold L2 that uses machine learning information.

The graph 200 depicts a gap 204 that indicates the difference between the dynamic threshold L2 and the static threshold L1 caused by the lowering of the threshold L2 based on machine learning. As such, the gap 204 represents the flexibility and improved efficiency between using the dynamic threshold L2 versus the static threshold L1. Data that "falls within" the gap 204 are more likely to be moved to the cold data area 102, resulting in more data being migrated compared to the use of the static threshold L1. The graph 200 further depicts another gap 205 that represents a uniform distance that the ML module 106 can maintain (by modifying the threshold L2) between the probability that a file will be accessed and the dynamic threshold that results in a certain ratio between hot and cold data.

Figure 3:
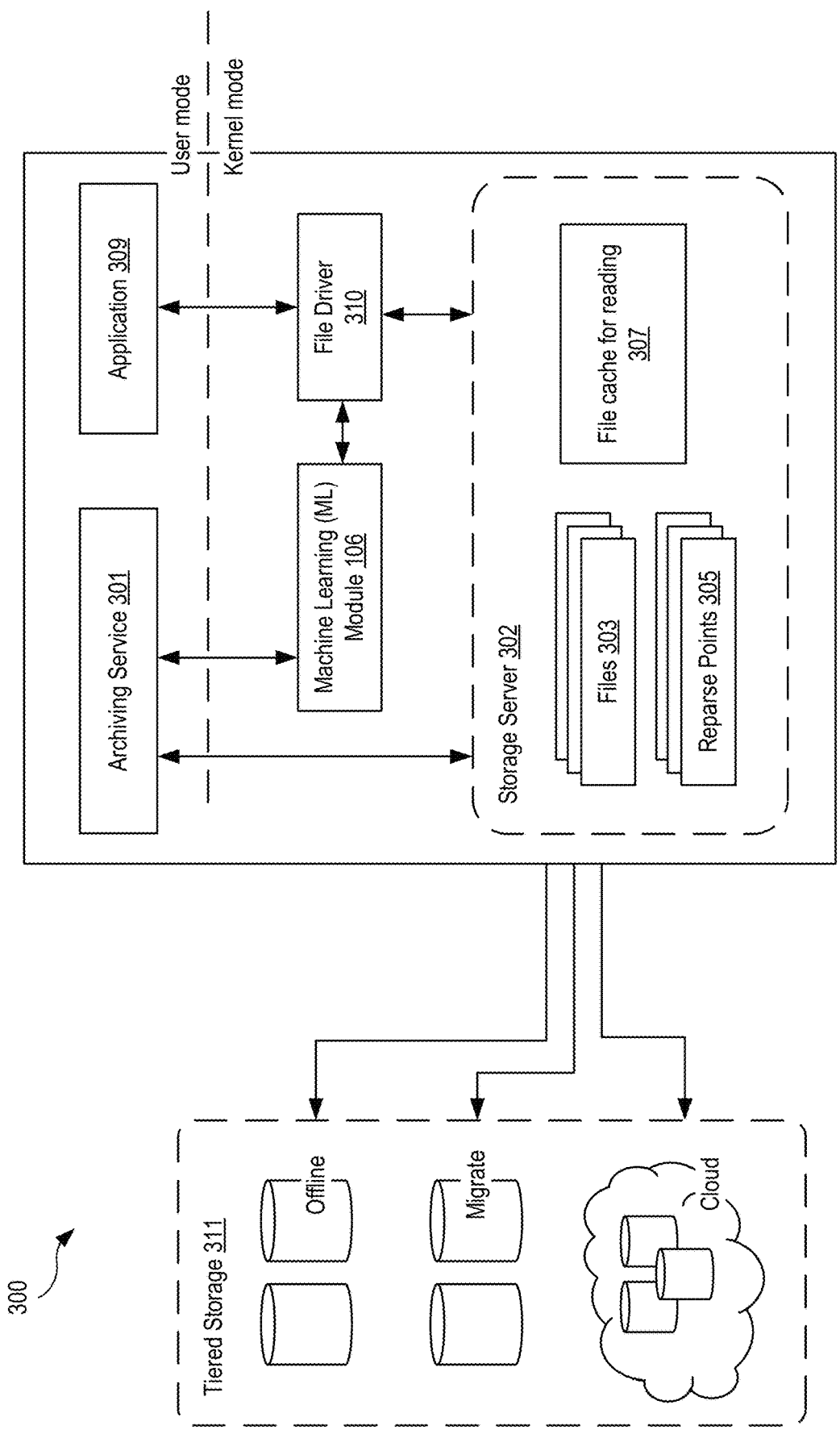
FIG. 3 is a block diagram illustrating a system for data archiving using machine learning according to another exemplary aspect.

FIG. 3 is a block diagram illustrating a system 300 for efficient file archiving using machine learning according to an exemplary aspect. The system 300 depicts one aspect of the present disclosure in which the machine learning (ML) module 106 of the system 100 described earlier may be used for efficiently archiving data and files. The system 300 includes an archiving service 301 (similar to the archiving module 104), a front-end storage server 302, a tiered storage system 311 (analogous to the archive storage 108), and a file driver 310.

The front-end storage server 302 is configured to store one or more files 303 and one or more reparse points 305, and includes a file cache for reading 107. The archiving service 301 is configured to scan through files 303 stored on the storage server 302 and archives them onto the tiered storage system 311. The archiving service 301 may archive files onto the tiered storage system 311 depending on an initial prediction of how much demand is on each of the files. As the archiving service 301 moves files to the tiered storage system 311, the archiving service 301 replaces each file 303 with a corresponding reparse point 305 that is a reference or link to the actual file. The storage server 302 maintains a list of the reparse points 305 that indicate the location of the data content within a particular tier in the tiered storage system 311 (e.g., whether it be in offline storage, cloud storage, etc.) While "reparse points" may be terminology native to a MS-Windows®-based operating systems and file systems (e.g., NTFS), it is understood that the aspects of the present disclosure may be adapted to other operating system and file system (e.g., macOS®, Linux®, etc.)

The tiered storage system 311 is a system for the hierarchical storage of files that stores files in various types of logical or physical storage devices having different levels of cost, reliability, and performance. For example, the tiered storage system 311 may include a plurality of storage tiers such as a high reliability, high performance, and premium cost first tier that may be used for important data that is accessed often, and a lower performance, and less expensive second tier that may be used for archive data or other infrequently-accessed data. In one exemplary aspect, the archiving service 301 may place archived files in different tiers within the tiered storage system 311, such as a cloud computing storage service (e.g., infrastructure as a service, or "IaaS"), an offline storage device (e.g., tape storage device), or a migration to a different storage.

The machine learning module 106 is configured to track the operations performed on storage server 302 by both the archiving service 301 and the file driver 310. In some aspects, the machine learning module 106 tracks the operations via a data statistics and analysis module 105 (not shown) that collects the information from the archiving service 301 and the file driver 310. Based on these tracked operations and historical data, the machine learning module 106 may generate one or more rules (e.g., data rules and patterns 107) that determine the data tiering of files in the tiered storage system 311, i.e., which particular tier a given file should be stored in for improved performance and efficiency. The machine learning module 106 may also generate one or more rules that predict the likelihood that a file 303 archived in the tiered storage system 311 will be accessed by an application (e.g., application 309). These predictions may modify a threshold value used to classify whether a file 303 is hot or cold data. For example, using these predictions, the described system 300 may re-classify a file 303 as hot data and retrieve a particular archived file in advance. The archived file may be placed in the file cache 307 prior to a file operation arriving from the file driver 310 for that file 303.

The file driver 310 is configured to handle I/O operations from one or more applications, such as application 309, executing in the system 300. The I/O operations may include file operations to read data from a file 303 stored in the storage server 302, write data to a file, delete files, and other operations. The file driver 310 may be a module component installed on an operating system, or an integrated part of a file system.

As described below, the system 300 includes two consecutive stages: (1) archiving of files; and (2) predictive extraction of those archived files. Each step may be optimized using the machine learning module 106.

Figure 4A:
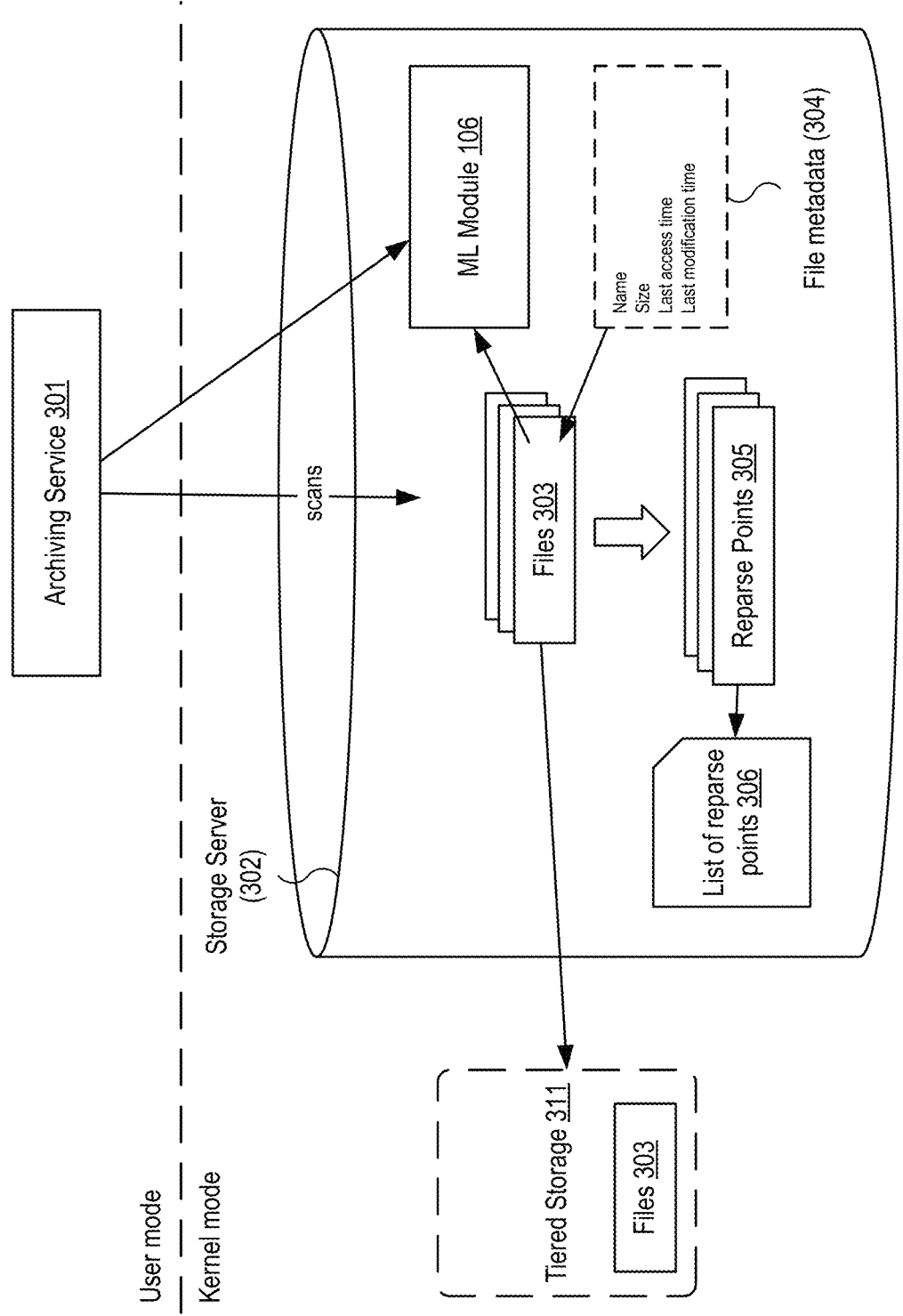
FIG. 4A is a block diagram illustrating example operations of a data archival stage according to an exemplary aspect.

FIG. 4A is a block diagram illustrating example operations of a data archival stage according to an exemplary aspect. During operation, the archiving service 301 scans the files 303 stored on the storage server 302 and archives them on the tiered storage system 311 depending on an initial hot/cold classification that represents a prediction of how much demand each of the files is in. That is, a "cold" file predicted to have the least demand may be migrated to a tier in the tiered storage system 311 having low cost and low performance specifications (e.g., tape drives), while a "hot" file predicted to have higher demand may remain on the storage server 302 which has high performance specifications than the tiered storage system 311. In some aspects, the system 300 may use more than two classifications (more than just hot/cold). That is, the archiving service 301 may use multiple classifications (e.g., "hot", "warm", "cool", "cold") that represent different tiers in storage (RAM, file cache, cloud, offline, respectively).

The information can be retrieved from file metadata 304 associated with the files 303, such as a file name, file size, a timestamp indicating the last time the file was accessed (i.e., last access time), a timestamp indicating the last time the file was modified (i.e., last modification time), and other suitable metadata. In some exemplary aspects, the machine learning module 106 provides the archiving service 301 with an initial prediction of a file's corresponding demand.

As described above, the files archived may be placed in different tiers within storage 311. For example, the files 303 can be archived in a cloud storage service, or in an offline storage facility, etc. After archiving, the archiving service 301 replaces each original files 303 with a reparse point 305 that references the corresponding original file. Each reparse points 305 acts as links or references to the real files 303. A user uses the reparse points as ordinary files, however, the content of the files have been moved from the front-end storage server 302 to the different storage tiers within storage 311. The storage server 302 may maintain a list 306 of reparse points that maps each of the reparse points 305 to the location or tier of the corresponding original file 303 in storage 311.

The machine learning module 106 tracks all the operations regarding the archiving of the files and collects information that is later used for more precise or accurate data tiering. The volume of information collected by the machine learning module 106 continuously increases, which enables every new operation of data archiving to be performed more accurately.

Figure 4B:
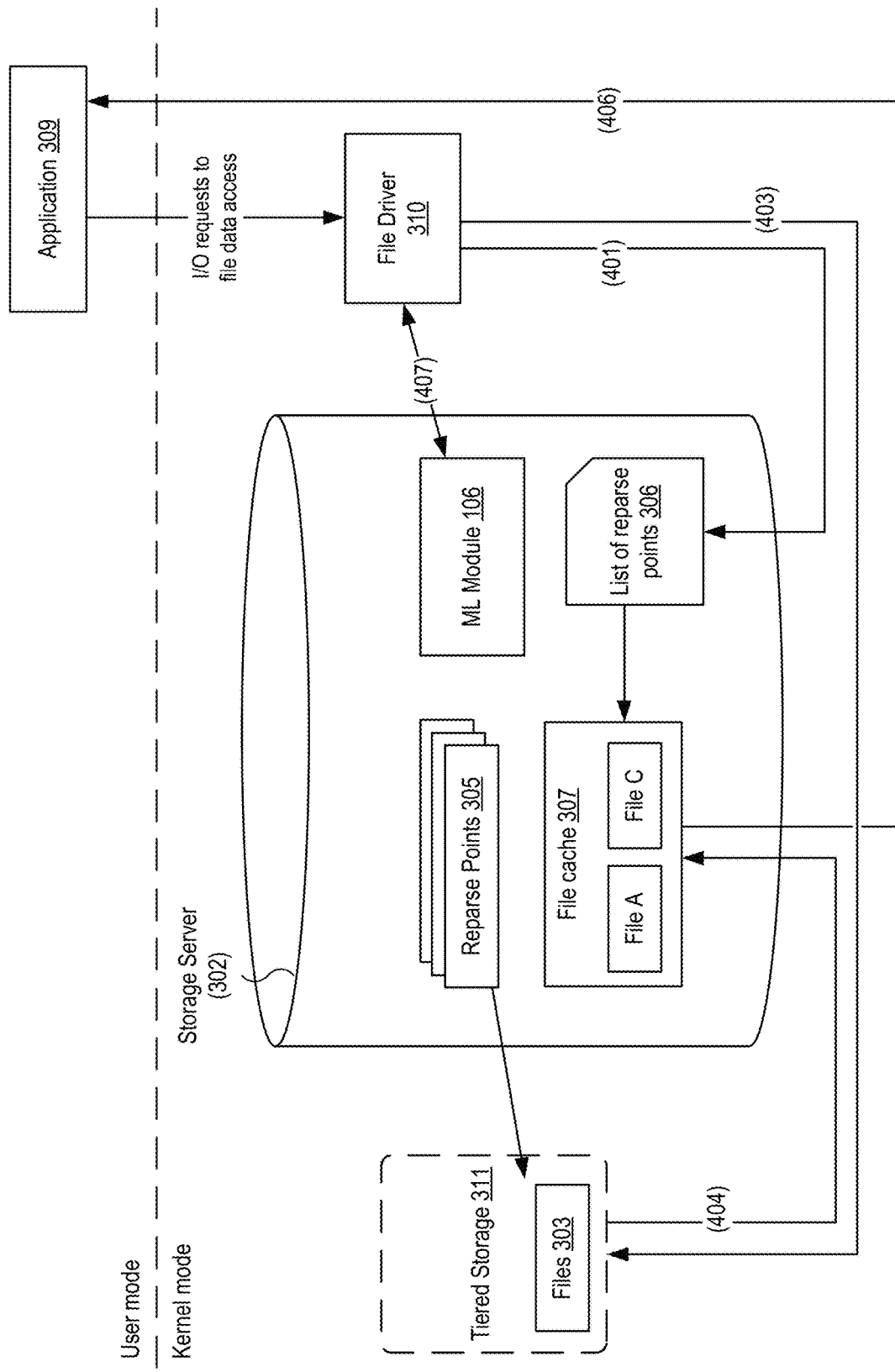
FIG. 4B is a block diagram illustrating example operations of a data extraction and retrieval stage according to an exemplary aspect.

FIG. 4B is a block diagram illustrating example operations of a data extraction and retrieval stage according to an exemplary aspect. During operation, an application 309 (executing in user space) sends a request to access one or more files in the storage server 302, but which are actually reparse points 305.

The file driver 310 checks the file availability on the storage server 302. The file driver 310 accesses the list 306 of reparse points and determines the tiering of the archived file in the tiered storage system 311 (operation 401). According to the access request, the file driver 310 retrieves the file 303 from the tiered storage system 311 and provides the content of the file back to the application 309. The machine learning module 106 continuously tracks all the file access requests from any certain applications (e.g., application 309) or any user.

According to these tracked operation, the machine learning module 106 generates rules, which can predict any possible file access requests from the user or applications. In one example, the machine learning module 106 may determine that a User A every morning opens a file X or a User A opens the folder with the photos, so after they open the first picture in this folder, it is very likely that the next picture in the folder will be opened as well.

Based on these predictions received from the machine learning module 106, the machine learning module 106 may re-classify certain files 303 as "hot" data and instruct the file driver 310 to extract certain files 303 from the tiered storage system 311 (operation 403). The file driver 310 may put these extracted files into the file cache for reading 107 in advance before the application 309 requests these files (operation 404). Due to this, if the application 309 does request these files at a subsequent point (operation 406), access to these files is quick and without any delays, even though the files had been archived and stored in a remote storage (e.g., offline or on a cloud storage service, etc.) Continuing the above example, based on such a prediction, the file driver 310 may extract the next pictures in the folder from the tiered storage system 311 and place them into the file cache 307 for later retrieval.

Figure 5:
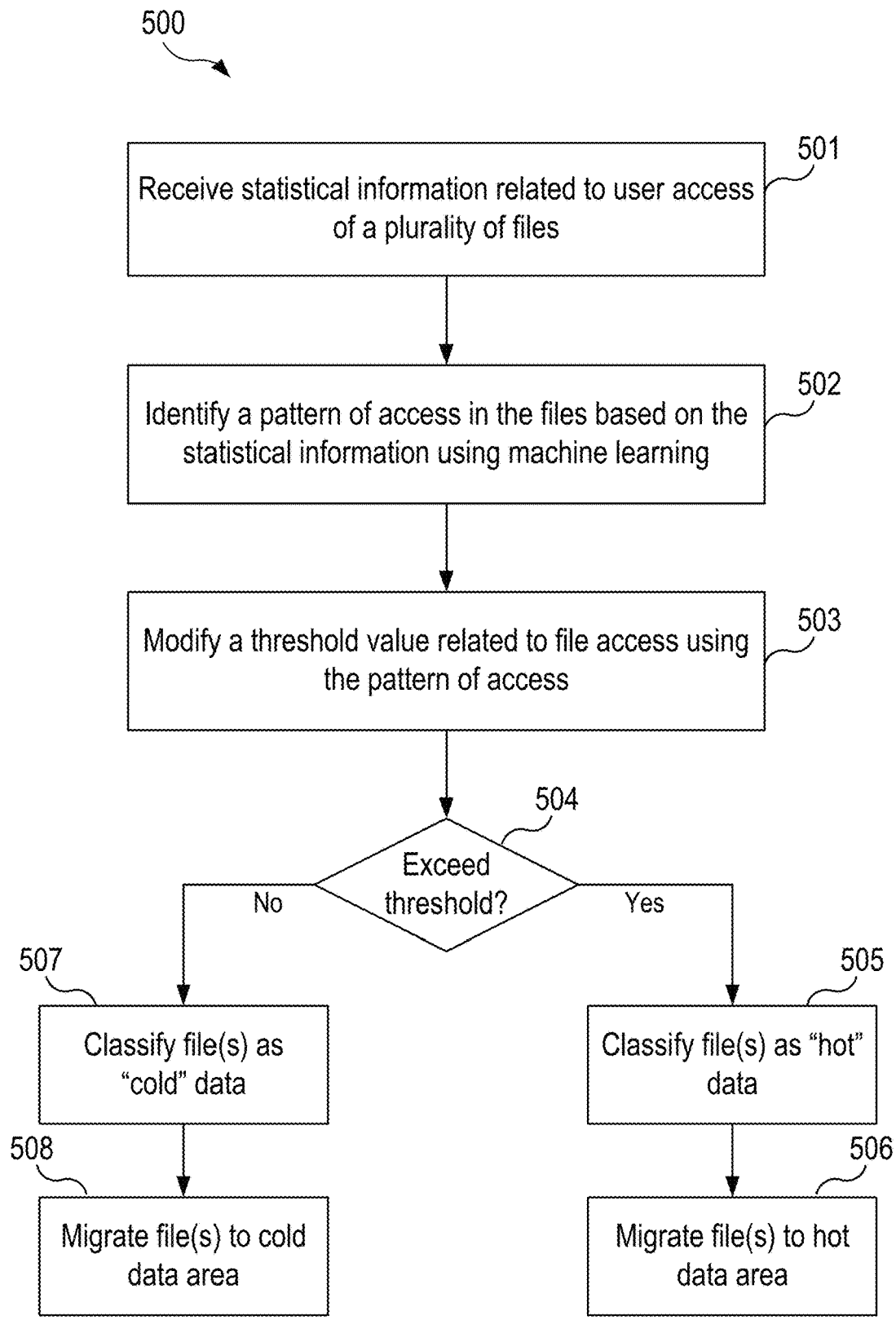
FIG. 5 is a flowchart illustrating a method for efficient file archiving using machine learning according to an exemplary aspect.

FIG. 5 is a flowchart illustrating a method 500 for efficient file archiving using machine learning according to an exemplary aspect. It is noted that the following description of the exemplary method makes reference to the system and components described above.

At step 501, the machine learning module 106 receives statistical information related to user access of a plurality of files. In some aspects, the machine learning module 106 receives information about file access operations for the plurality of files from a data statistics and analysis module 105 or a file driver 310. In other aspects, the machine learning module 106 may receive updates and information about the archival operations performed by the archiving service 301.

It is understood that the received statistical information and identified pattern of access is not limited to simply the number of access requests to a certain file (or group of files), but may take into many parameters. In some aspects, the pattern of access is further based on one or more of a number of access requests, time of access requests, and file size of the plurality of files. In some aspects, the pattern of access may be based on the time of requests, as indicated by the statistical information. For example, a pattern of access can indicate that a file is requested often, but during off peak times, or indicate that another file is requested infrequently, but always during peak times of operation. Based on such a pattern, the machine learning module 106 may direct the storage system to move the latter file to hot storage more readily or likely than the former file. In some aspects, the pattern of access may be based on the file sizes of the files. For example, as discussed earlier, a pattern of access associated with files having a small file size and requested frequently can be stored on cold storage based on a heuristic indicating that less time is needed to migrate them if needed. Accordingly, as described herein, the dynamic threshold can take into account more than one of the above-described parameters (two or more) and, this threshold is changed simultaneously depending on circumstances and many different factors.

At step 502, the machine learning module 106 identifies a pattern of access in the plurality of files based on the received statistical information. In some aspects, the identified pattern of access comprises a pattern specifies a periodic window of time in which at least one of the plurality of files is frequently accessed. In some aspects, the machine learning module 106 generates one or more rules (e.g., data rules and patterns 107) that predict access of the plurality of files based on the received statistics information.

In other aspects, the machine learning module 106 may generate, based on the statistical information, a sequence-to-sequence model indicating an occurrence of a first event is associated with an occurrence of a second event related to access of at least one of the plurality of files. For example, the sequence-to-sequence model might specify the occurrence of the first event being execution of an application is associated with the occurrence of the second event being access of at least one of the plurality of files having the same file type as the application. In some aspects, responsive to detecting the first event has occurred, the machine learning module 106 may modify the threshold value related to file access indicating a probability of future access of the at least one of the plurality of files. In other aspects, responsive to detecting the first event has occurred, the machine learning module 106 may direct the archiving system 104 to migrate at least one of the plurality of files to the second storage device.

At step 503, the machine learning module 106 modifies, using the identified pattern of access, a threshold value related to file access. In some aspects, the machine learning module 106 instructs the archiving module 104 to modify its threshold that it uses for archiving. In some aspects, the machine learning module 106 decreases the threshold value related to file access in response to the identified pattern of access indicating a decrease in likelihood that the plurality of files will be accessed.

In some aspects, the archiving module 104 may assign a set of files (e.g., a first file, a group of files) of the plurality of files an access classification based on the modified threshold value. At step 504, the archiving module 104 determining whether each of the files (e.g., a first file) exceeds the modified threshold value related to file access. If so, at step 505, the archiving module 104 assigns the access classification responsive to determining that access requests or other criteria for the set of file(s) exceeds the threshold value related to file access, wherein the access classification is a hot data access classification. That is, the archiving module 104 classifies those particular file(s) as "hot" data. At step 506, the archiving module 104 migrates the set of files to the hot data area 101. In some aspects, the set or group of files is migrated from a first storage device to a second storage device based on the assigned access classification. In some aspect, the first storage device (having higher performance characteristics) is associated with a hot data access classification and the second storage device is associated with a cold data access classification.

At step 507, responsive to determining that the access requests or other data associated with the set of files (e.g., first file) does not exceed the threshold value related to file access, the archiving module 104 may assign the access classification of a cold data access classification. That is, the archiving module 104 classifies those particular file(s) as "cold data." Subsequently, at step 508, the archiving module 104 migrates the set or group of files to the "cold" data area 102.

Figure 6:
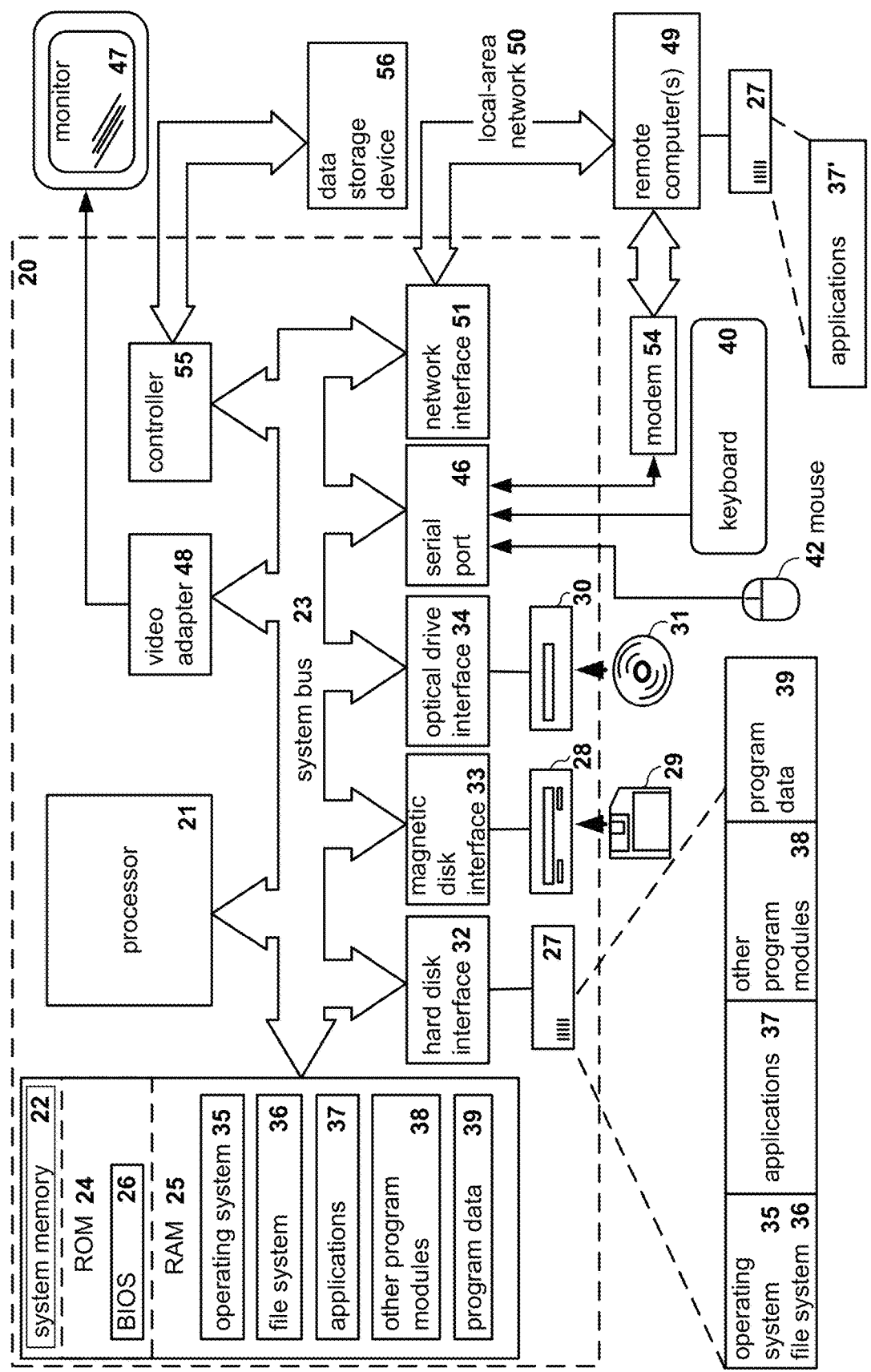
FIG. 6 is a block diagram of a computer system on which the disclosed system and method can be implemented according to an exemplary aspect.

FIG. 6 is a block diagram illustrating a computer system 20 on which aspects of systems and methods for scanning web pages may be implemented in accordance with an exemplary aspect. It should be noted that the computer system 20 can correspond to the system 100, system 300, storage server 302, or tiered storage system 311, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for data archiving using machine learning, comprising:
receiving statistical information related to user access of a plurality of files stored in a cold storage device;
generating a sequence-to-sequence model that is configured to determine, for an initial sequence of prior file requests, a resulting sequence of subsequent file requests that have a greatest likelihood of being received, wherein the sequence-to-sequence model determines the resulting sequence by identifying patterns of access in the statistical information, and wherein a first pattern of access comprises an execution of an application compatible with a given file type and a subsequent request to access a file of the given file type;
executing, by a hardware processor, the sequence-to-sequence model on an input sequence comprising a first ordered set of file requests that includes an execution of the application compatible with the given file type;
receiving, from the sequence-to-sequence model, an output sequence comprising a second ordered set of file requests for at least one of the plurality of files having the given file type;
modifying a threshold value indicative of whether to store the at least one of the plurality of files in a hot storage device responsive to the resulting sequence of subsequent file requests that have the greatest likelihood of being received, wherein the hot storage device has quicker data retrieval than the cold storage device, wherein the threshold value is a file group specific threshold value calculated for a particular group of files from the plurality of files responsive to the resulting sequence of subsequent file requests that have the greatest likelihood of being received;
wherein the particular group of files is determined based on having at least one same file type from among a plurality of file types; and
migrating the at least one of the plurality of files from the cold storage device to the hot storage device based on the modified threshold value.

2. The method of claim 1, wherein modifying the threshold value comprises:
increasing the threshold value related to file access in response to the sequence-to-sequence model indicating an increase in likelihood that the at least one of the plurality of files will be accessed.

3. The method of claim 1, wherein the sequence-to-sequence model identifies the initial sequence and the resulting sequence based on at least one of: a number of access requests, time of access requests, and file size of the plurality of files.

4. The method of claim 1, migrating the at least one of the plurality of files back to the cold storage device from the hot storage device subsequent to the at least one of the plurality of files being accessed.

5. The method of claim 1, wherein the sequence-to-sequence model is an encoder-decoder recurrent neural network (RNN), wherein an encoder of the encoder-decoder RNN is configured to receive the initial sequence and a decoder of the encoder-decoder RNN is configured to output the resulting sequence.

6. A system for data archiving using machine learning, comprising:
- a cold storage device;
- a hot storage device; and
- a hardware processor configured to:
  - receive statistical information related to user access of a plurality of files stored in the cold storage device;
  - generate a sequence-to-sequence model that is configured to determine, for an initial sequence of prior file requests, a resulting sequence of subsequent file requests that have a greatest likelihood of being received, wherein the sequence-to-sequence model determines the resulting sequence by identifying patterns of access in the statistical information, and wherein a first pattern of access comprises an execution of an application compatible with a given file type and a subsequent request to access a file of the given file type;
  - execute the sequence-to-sequence model on an input sequence comprising a first ordered set of file requests that includes an execution of the application compatible with the given file type;
  - receive, from the sequence-to-sequence model, an output sequence comprising a second ordered set of file requests for at least one of the plurality of files having the given file type;
  - modify a threshold value indicative of whether to store the at least one of the plurality of files in a hot storage device responsive to the resulting sequence of subsequent file requests that have the greatest likelihood of being received, wherein the hot storage device has quicker data retrieval than the cold storage device,
  - wherein the threshold value is a file group specific threshold value calculated for a particular group of files from the plurality of files responsive to the resulting sequence of subsequent file requests that have the greatest likelihood of being received;
  - wherein the particular group of files is determined based on having at least one same file type from among a plurality of file types; and
  - migrate the at least one of the plurality of files from the cold storage device to the hot storage device based on the modified threshold value.

7. The system of claim 6, wherein the hardware processor is configured to modify the threshold value by:
- increasing the threshold value related to file access in response to the sequence-to-sequence model indicating an increase in likelihood that the at least one of the plurality of files will be accessed.

8. The system of claim 6, wherein the sequence-to-sequence model identifies the initial sequence and the resulting sequence based on at least one of: a number of access requests, time of access requests, and file size of the plurality of files.

9. The system of claim 6, wherein the hardware processor is further configured to migrate the at least one of plurality of files back to the cold storage device from the hot storage device subsequent to the at least one of the plurality of files being accessed.

10. The system of claim 6, wherein the sequence-to-sequence model is an encoder-decoder recurrent neural network (RNN), wherein an encoder of the encoder-decoder RNN is configured to receive the initial sequence and a decoder of the encoder-decoder RNN is configured to output the resulting sequence.

11. A non-transitory computer readable medium comprising computer executable instructions for data archiving using machine learning, including instructions for:
- receiving statistical information related to user access of a plurality of files stored in a cold storage device;
- generating a sequence-to-sequence model that is configured to determine, for an initial sequence of prior file requests, a resulting sequence of subsequent file requests that have a greatest likelihood of being received, wherein the sequence-to-sequence model determines the resulting sequence by identifying patterns of access in the statistical information, and wherein a first pattern of access comprises an execution of an application compatible with a given file type and a subsequent request to access a file of the given file type;
- executing, by a hardware processor, the sequence-to-sequence model on an input sequence comprising a first ordered set of file requests that includes an execution of the application compatible with the given file type;
- receiving, from the sequence-to-sequence model, an output sequence comprising a second ordered set of file requests for at least one of the plurality of files having the given file type;
- modifying a threshold value indicative of whether to store the at least one of the plurality of files in a hot storage device responsive to the resulting sequence of subsequent file requests that have the greatest likelihood of being received, wherein the hot storage device has quicker data retrieval than the cold storage device,
- wherein the threshold value is a file group specific threshold value calculated for a particular group of files from the plurality of files responsive to the resulting sequence of subsequent file requests that have the greatest likelihood of being received;
- wherein the particular group of files is determined based on having at least one same file type from among a plurality of file types; and
- migrating the at least one of the plurality of files from the cold storage device to the hot storage device based on the modified threshold value.

* * * * *